United States Patent [19]

Himelstein et al.

[11] Patent Number: 5,124,693

[45] Date of Patent: Jun. 23, 1992

[54] THREE DIMENSIONAL GRAPHIC DISPLAY WITH USER DEFINED VANISHING POINT

[75] Inventors: Carol S. Himelstein; John S. Wang, both of Travis County, Tex.

[73] Assignee: International Business Machines, Armonk, N.Y.

[21] Appl. No.: 697,486

[22] Filed: May 2, 1991

Related U.S. Application Data

[63] Continuation of Ser. No. 467,298, Jan. 18, 1990, abandoned, which is a continuation of Ser. No. 792,662, Oct. 29, 1985, abandoned.

[51] Int. Cl.$^5$ .............................................. G09G 5/00
[52] U.S. Cl. .................................... 340/729; 395/119; 395/127
[58] Field of Search .................. 340/723, 727, 729; 364/518, 521, 522; 395/119, 127

[56] References Cited

U.S. PATENT DOCUMENTS

| | | | |
|---|---|---|---|
| 4,600,200 | 7/1986 | Okada et al. | 364/522 |
| 4,609,917 | 9/1986 | Shen | 340/729 |
| 4,674,046 | 6/1987 | Ozeki et al. | 364/522 |
| 4,734,690 | 3/1988 | Waller | 340/729 |

FOREIGN PATENT DOCUMENTS 0172920 3/1985 European Pat. Off. .

OTHER PUBLICATIONS

N.E.C. Research and Development, No. 74, Jul. 1984, pp. 17–23, Tokyo, JP; K. Kashigi et al., "Optiflex-Rotation Perspective Adapter".

Primary Examiner—Jeffery A. Brier
Attorney, Agent, or Firm—Casimer K. Salys

[57] ABSTRACT

A user interactive computer graphic display which generates three dimensional perspective projections of graphics objects. The user can specify the location of the vanishing point of the perspective projection before or after the generation of the graphics objects on the display. Moreover, the vanishing point can be moved by the user resulting in the simultaneous changing of the perspective projection of the graphics objects so that the most pleasing three dimensional display can be achieved. The user may specify a length of the projection lines which defines the depth of the three dimensional projection, or the user can accept a default depth. The entire editing set available for editing two dimensional graphics objects is available for editing the perspective projection of the graphics objects.

4 Claims, 8 Drawing Sheets

THREE DIMENSIONAL GRAPHIC DISPLAY WITH USER DEFINED VANISHING POINT

This is a continuation of application Ser. No. 07/467,298, filed Jan. 18, 1990, now abandoned which is a continuation of application Ser. No. 06/792,662, filed Oct. 29, 1985 now abandoned.

DESCRIPTION

1. Field of the Invention

This invention generally relates to user interactive computer graphic displays and, more particularly, to a technique for creating a three dimensional graphic space such that every object created within that space is a three dimensional perspective projection with a reference to a common vanishing point which may be user defined.

2. Description of the Prior Art

Computer graphics displays and presentations are becoming increasingly important as business tools. It is now common to generate business graphics such as bar charts, pie charts and line graphs to depict data in a data base or a spread sheet. More recently, the use of draw graphics has been introduced to give additional flexibility and impact to a computer graphics presentation. Using draw graphics, various defined geometrical shapes such as circles and rectangles can be generated as well as freehand graphics using a draw cursor controlled by a stylus, mouse or digitizer.

Generally, most business graphics and draw graphics application programs have been limited to two dimensional presentations, especially those applications written to run on microcomputers or so-called "personal computers". Adding a third dimension to the graphics display provides depth and adds to the impact of the display. A few application programs have been written to provide this third dimension or depth to a graphics display, but typically these programs are limited to an isometric type of projection from the two dimensional graphics. This type of projection, while an improvement over the original two dimensional graphics display, has a certain mechanical quality about it that lacks realism. A more realistic, and hence more acceptable, three dimensional display would be achieved by a perspective drawing. Also lacking in prior art graphics applications is the ability to make an automatic conversion from a two dimensional display to a three dimensional display. Moreover, in those graphics applications which do provide a three dimensional display, typically not all the functions that are available for two dimensional objects are available for three dimensional objects.

SUMMARY OF THE INVENTION

It is therefore an object of this invention to provide a graphics display capable of automatically converting between two dimensional objects and three dimensional objects.

It is another object of the invention to provide a graphics system which presents a three dimensional perspective drawing of graphics objects originally generated in two dimensions and wherein the vanishing point for the perspective drawing is user controlled.

It is a further object of this invention to provide a graphics system in which, as the user is drawing a graphics object of any type including a free hand drawing, the object will be presented in a three dimension perspective drawing.

According to the present invention, the user may select, from a choice of options, that a three dimensional graphic space be created. Once the three dimensional graphics space has been created, the user can select a vanishing point which can be located at any point within the graphic space. The user then selects an ending point for the projection lines from the two dimensional drawing, this ending point determines the depth of the graphic objects. Alternatively, the user may accept a default depth.

A special problem is presented by curved objects which are created by many vertices. For curved objects, the projection lines cannot be drawn at every vertex because there are so many that the resulting drawing would be too "busy" and not look good to the user. Therefore, the projections are drawn at intervals along the curved surface. The length of the interval is user defined.

Besides being able to create a three dimensional perspective drawing by initially selecting the option to create a three dimensional graphic space, it is also possible for the user who has created a two dimensional drawing to convert that drawing to a three dimensional drawing. This is done with a "CONVERT" command which allows the user to select the option of creating a three dimensional graphics space. Using a pointing device such as a mouse, the user can dynamically move the vanishing point around on the display screen causing dashed projection lines to rubberband from the vertices of the graphics objects to the vanishing point. Those projection lines which are hidden either by their own projection or the projection of other objects are not displayed but will be displayed when the vanishing point is moved to locations where the projection lines are no longer hidden. This dynamic movement of the vanishing point can be used as well for those drawings which were originally drawn in a three dimensional graphic space and allows the user to easily generate the most pleasing three dimensional drawing.

BRIEF DESCRIPTION OF THE DRAWINGS

The foregoing and other objects, aspects and advantages of the invention will be better understood from the following detailed description of a preferred embodiment of the invention with reference to the drawings, in which.

DETAILED DESCRIPTION OF THE PREFERRED EMBODIMENT OF THE INVENTION

Figure 1:
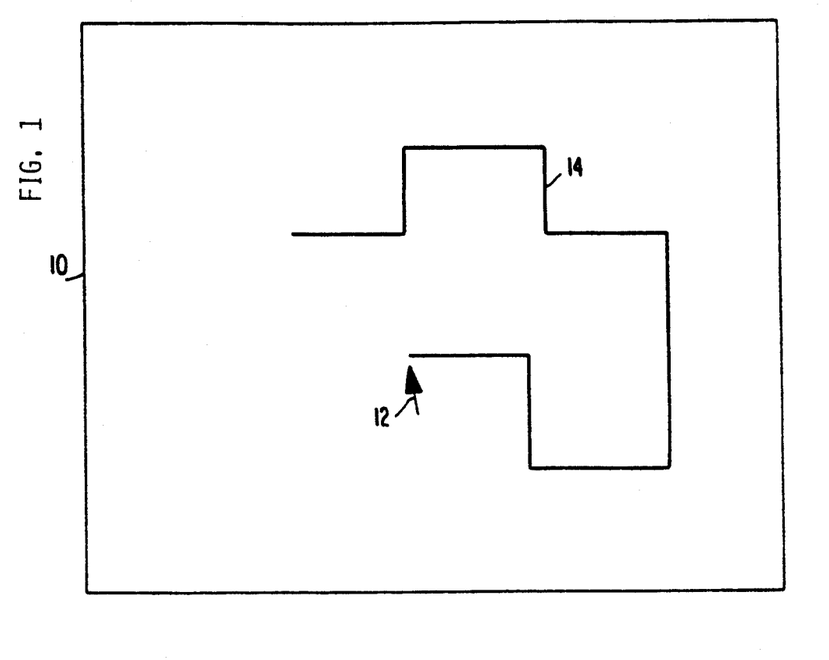
FIGS. 1 to 6 are representations of graphical images on a computer display screen showing the progressive development of a three dimensional graphic object in the three dimensional graph space.

For a more detailed understanding of this invention, reference is first made to FIG. 1 of the drawings. In this figure, there is illustrated a window 10 which is assumed to be displayed on an all points addressable (APA) or bit-mapped display such as a cathode ray tube (CRT), liquid crystal display (LCD), plasma display or the like which is controlled by a standalone or host connected computer workstation or system. Display and control of the window 10 can be by means of an application program useable by the workstation.

When operation is within the window, the point of operation can be denoted by a cursor 12, as shown in FIG. 1. As the cursor 12 is moved by a locator device, the point of operation is moved. The locator device can be a mouse, trackball, keyboard, joystick or other cursor locator device. The particular characteristics of cursor 12 are unimportant as far as this invention is concerned. Cursor location and movement are directly related to editing. Editing encompasses insertion, deletion, replacement, and other similar operations. Of course, it is to be appreciated that there are instances where editing can be accomplished independently of cursor location and motion.

Figure 2:
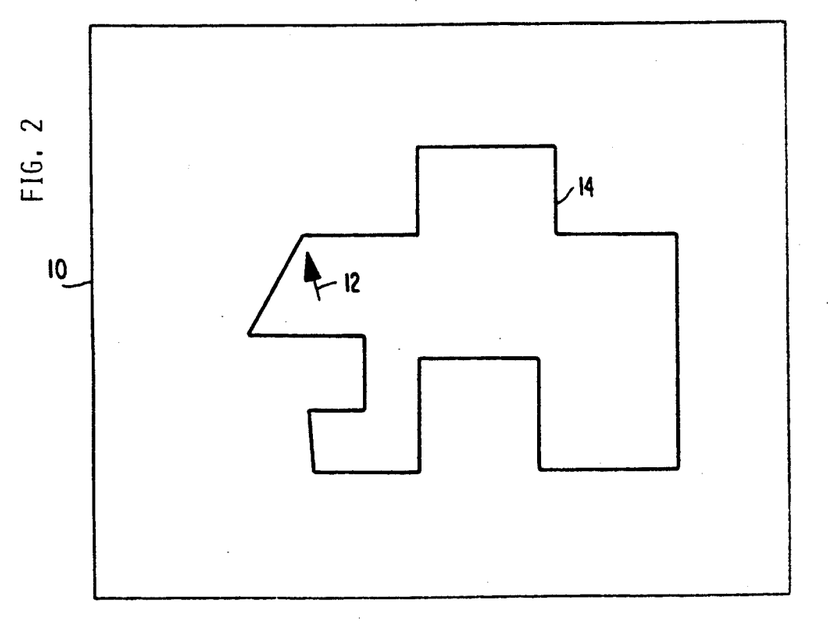

In FIG. 1, the object 14 being drawn is in a two dimensional graphic space. Only the lines in the XY plane are shown. In FIG. 2, the completed object of FIG. 1 is shown. Again, only the lines in the XY plane are shown as this is still a two dimensional space.

Figure 3:
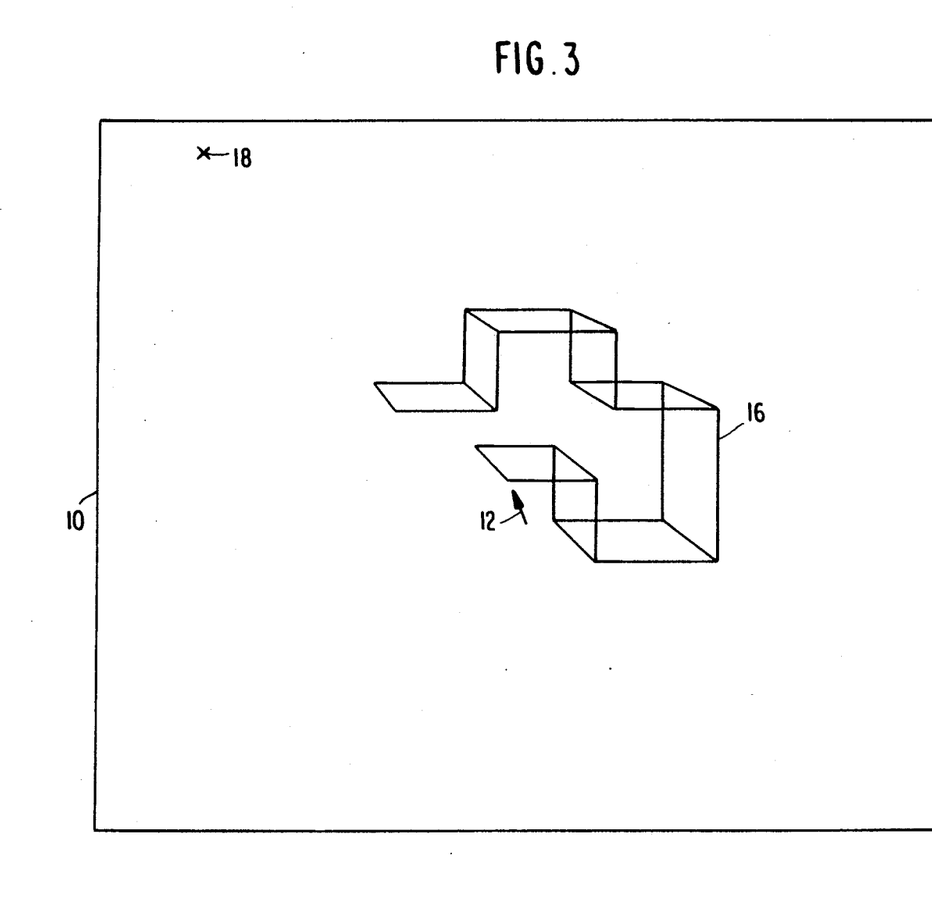
Figure 4:
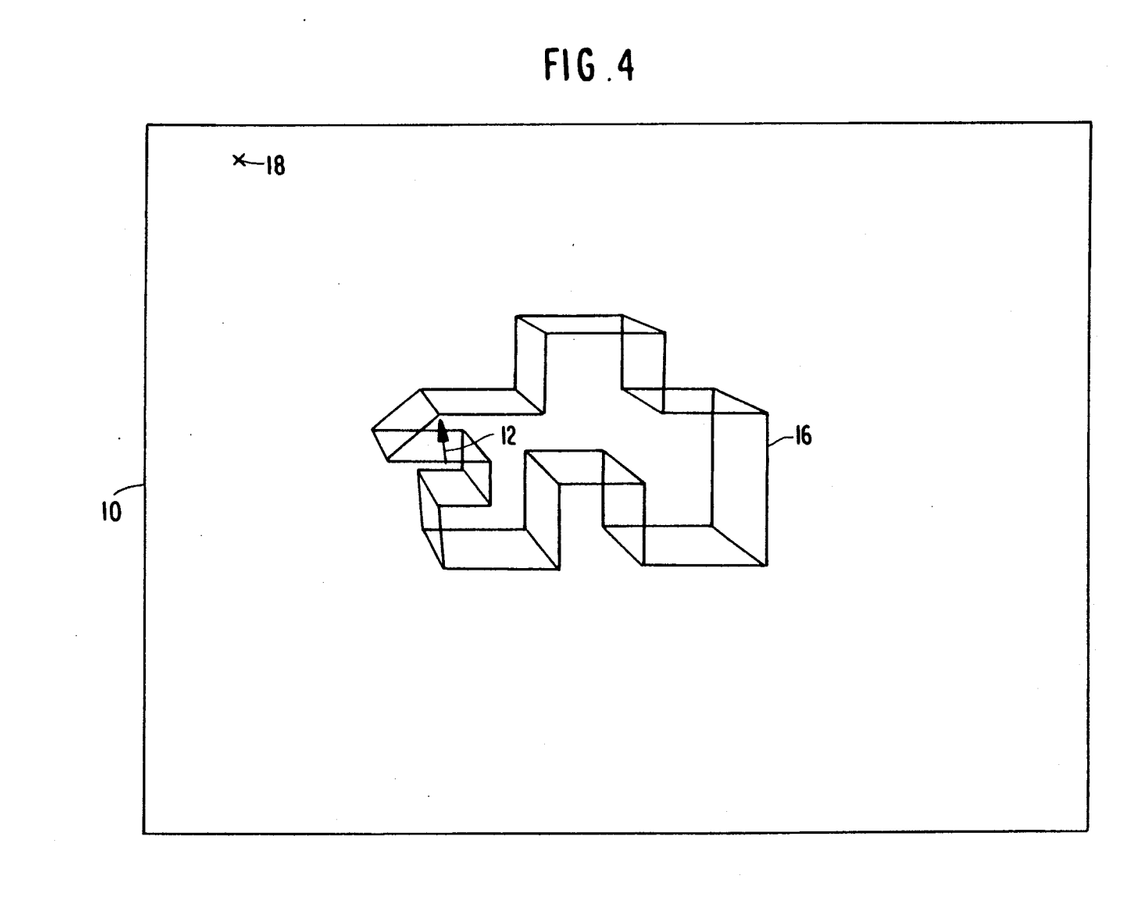

Turning now to FIG. 3, the object 16 is being drawn in three dimensional space. As the user moves the cursor across in graphic space while in the drawing mode, lines appear in the XY, XZ and YZ planes. The Z dimension is a default value that can be modified by the user during another editing session. The vanishing point 18 of object 16 is in the upper left corner of the illustrated graphic space. FIG. 4 shows the object from FIG. 3 as the user completes the drawing. Again, the object is displayed as three dimensional with a default depth and vanishing point in the upper left hand corner.

Figure 5:
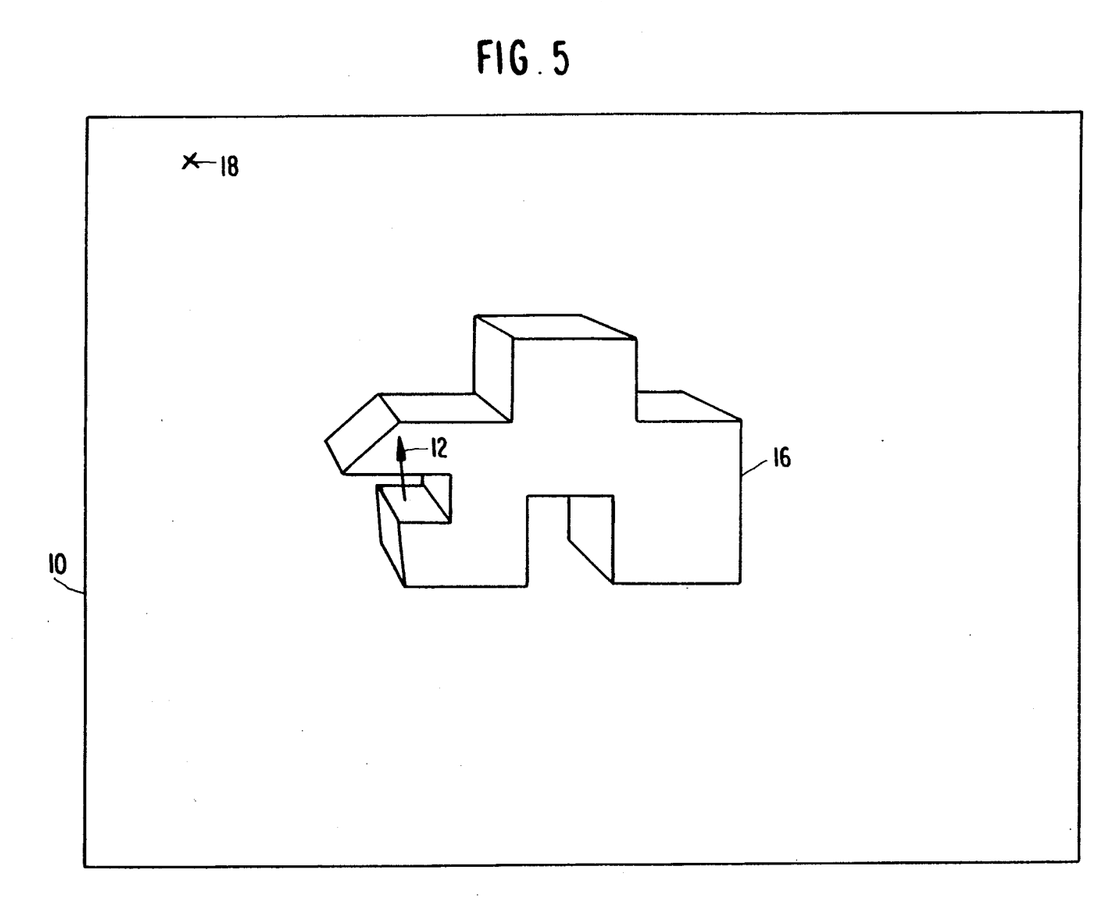
Figure 6:
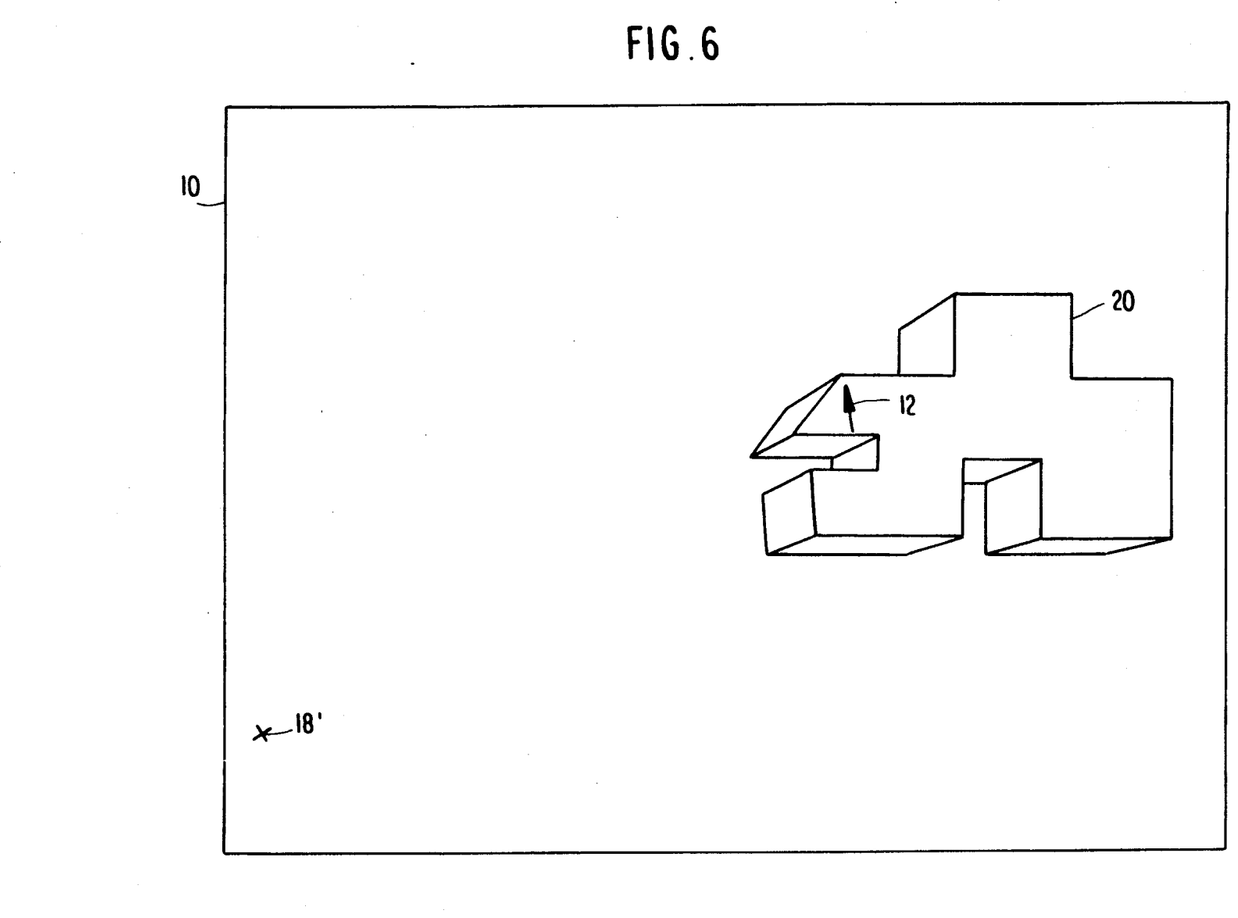

FIG. 5 shows the object from FIGS. 3 and 4 with the hidden lines removed. The hidden lines will automatically be removed from an object in three dimensional space if the object has an opaque attribute. FIG. 6 shows an object 20 which is similar to the object in FIG. 5 but with the vanishing point 18' in the lower left hand corner. As previously described, the user has control over the position of the vanishing point.

Figure 7:
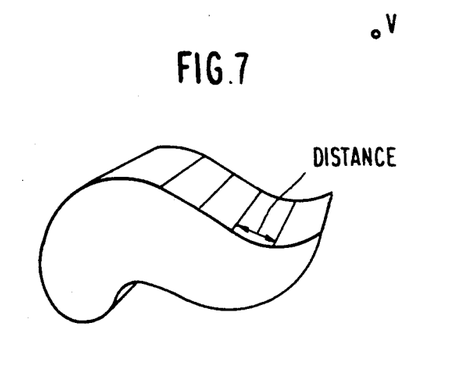
FIG. 7 is a representation of a graphical image on a computer screen showing the drawing of projection lines from vertices of a curved line with a user defined spacing.

FIG. 7 shows the special case of curved objects. These objects are created by many vertices and, therefore, it is not practical to draw projection lines from every vertex. Moreover, to do so would create a "busy" drawing that would not look good to the user. As shown in the figure, a few projection lines drawn at intervals along the curved surface give a hint of surface shading which is pleasing in overall appearance. The length of the interval between projection lines is user defined, and once defined, projection lines are drawn from spaced vertices along the curved surface as with non-curved surfaces.

Figure 8:
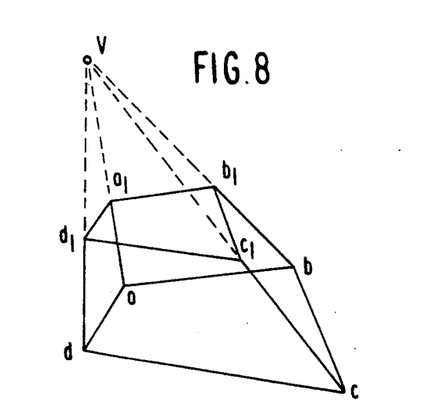
FIG. 8 is a representation of a graphical image on a computer screen illustrating the algorithm for specifying the depth of a three dimensional object.

Referring now to FIG. 8, the steps required for generating the projection lines of the perspective image will now be described. When the user creates a line segment a-b with a default vanishing point v, there are two projection lines from v. These are the lines v-a and v-b. Let $a_1$ be the point on the line va such that the distance between $a_1$ and a is equal to the default depth. Let $b_1$ be the point on line vb such that line $a_1$-$b_1$ is parallel to line a-b. A similar analysis can be made of the other line segments in FIG. 8. The liens v-$a_1$, v-$b_1$, v-$c_1$, and v-$d_1$ are shown in dashed line and do not appear on the computer display screen. The object a-b-c-d is called the "front polygon" the object $a_1$-$b_1$-$c_1$-$d_1$ is called the "back polygon", and the objects a-b-$b_1$-$a_1$, b-c-$c_1$-$b_1$, c-d-$d_1$-$c_1$, and a-d-$d_1$-$a_1$ are called the "side polygons". The lines $a_1$-a, $b_1$-b, $c_1$-c, and $d_1$-d are called the edges of the displayed object.

Removing hidden lines of the object can be done by removing those edges, or parts thereof, which are covered by the front polygon or any of the side polygons. The hidden line removal process starts by removing every line segment which is inside the front polygon. This step is unnecessary if the object is not closed. Every side polygon is then clipped against the front polygon. The side polygons are stored in a polygon list, and every polygon in the polygon list is then compared with every other polygon in the list. If any polygon overlaps another polygon, then the edges of the latter polygon which are overlapped by the former are removed. The process terminates when every polygon is checked with every other polygon in the list.

Figure 9A:
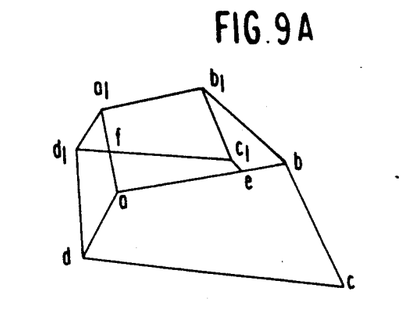
FIGS. 9A, 9B and 9C are representations of graphical images on a computer display screen showing the progressive steps in removing hidden lines from the displayed image.
Figure 9B:
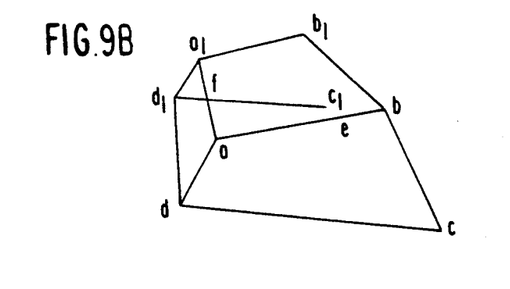
Figure 9C:
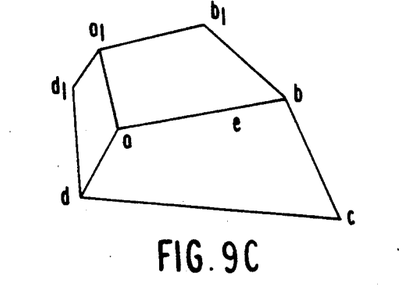

FIGS. 9A, 9B and 9C illustrates the process of hidden line removal. First, every line within the front polygon is removed resulting in the image shown in FIG. 9A. Then each side polygon is clipped against the front polygon and stored in the polygon list as follows:

side polygon a-b-$b_1$-$a_1$ is clipped into a-b-$b_1$-$a_1$, i.e., it remains unchanged;

side polygon b-c-$c_1$-$b_1$ is clipped into b-e-$c_1$-$b_1$;

side polygon c-d-$d_1$-$c_1$ is clipped into d-$d_1$-$c_1$-e-a; and side polygon a-d-$d_1$-$a_1$ is clipped into a-d-$d_1$-$a_1$, i.e., it remains unchanged.

Since b-c-$c_1$-$b_1$ is completed within a-b-$b_1$-$a_1$ and lines $b_1$-$c_1$ and $c_1$-e are not part of the polygon a-b-$b_1$-$a_1$, they are removed in FIG. 9B. The polygon d-$d_1$-$c_1$-e-a is completely covered by both the polygons a-d-$d_1$-a and a-b-$b_1$-$a_1$, and since line $c_1$-$d_1$ is not part of either of polygons a-d-$d_1$-$a_1$ or a-b-$b_1$-$a_1$, it is removed in FIG. 9C which shows the final result.

After the three dimensional object is created by using the default vanishing point and default depth, the user can modify the depth by selecting the depth attribute from a describe popdown panel on the command bar at the top of the computer display screen. The cursor is then moved by the system to the first system generated point $a_1$. When the user is holding the mouse button down and moving the mouse, the depth is changed according to the pointing cursor position. The removed hidden lines reappear for better performance. A new depth is defined when the user releases the mouse button. At that time, all the hidden lines are again removed from the display screen.

The user can also move the vanishing point as previously indicated in FIG. 6 by selecting the vanishing point attribute from the describe popdown panel on the command bar. The cursor is then moved by the system to the vanishing point v. When the user is holding the mouse button down and moving the mouse, the vanishing point is moved according to the pointing cursor position. The removed hidden lines reappear for better performance. The new vanishing point is defined when the user releases the mouse button. At that time, all the hidden lines are again removed.

To edit the three dimensional object, the object is treated the same as a two dimensional object. That is, only the forward object or front polygon is considered. It can be rotated, scaled, stretched, mirror inversed, moved, or otherwise edited just as if it were a two dimensional object. After the editing function is completed, all the edges and the back polygon are removed from the display and the new back polygon and edges are redrawn according to the new modified front polygon. The hidden lines are then removed by using the same algorithm as described above.

Translation from two dimensions to three dimensions or from three dimensions to two dimensions may also be accomplished by the user. Since every graphic object has to be inside the graph space, the graph space has an attribute describing it as either two dimensional or three dimensional. If the user intends to change a two dimensional graph space into a three dimensional graph space, the user selects the graph space and then selects the three dimensional attribute from the describe popdown panel on the command bar. Every object within the graph space is then changed into a three dimensional object by using the system default vanishing point and depth. The hidden lines are then removed from those graphic objects with an opaque attribute. To do the reverse, the back polygon and the edges are simply removed to convert graphic objects from three dimensional objects to two dimensional objects.

From the foregoing, it will be appreciated that the user of the interactive document editing program can create graphic pictures within his document. Each of these pictures is referred to as a graphic space. To access any portion of the graphic space or the graphic space itself, the user must move the pointing cursor with the locator device to the objects or graphic space he wants selected and press the SELECT key. This tells the system that any ensuing action will be done on that object.

Figure 10:
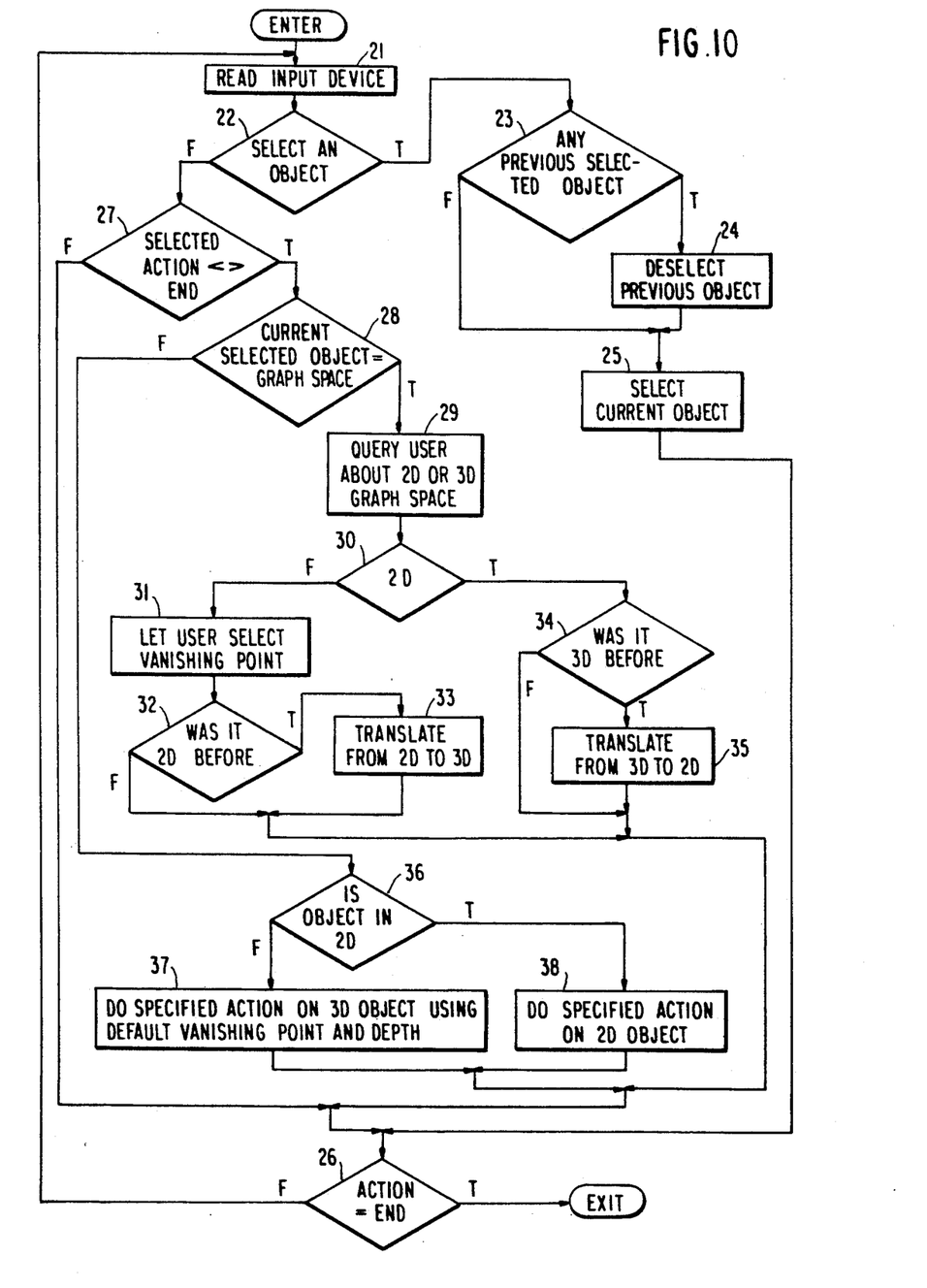
FIGS. 10 and 11 are flow charts illustrating the process according to the present invention.

The flowchart shown in FIG. 10 assumes that the graphic space has already been created and that the user is moving the pointing cursor around the visible document area in anticipation of selecting an object for editing. Block 21 indicates the system's means of tracking the user's input. The user can select one of two things at this point; he can select an action, or he can select an object. An object being either an individual or group of graphical objects such as a circle or a box, or an entire graphic space. After the user has specified his request, the system analyzes the request in block 22 to see which path to take.

If the user selects an object or a graphic space, then the system checks to see if another object was previously selected in block 23 and, if so, deselects it in block 24. The system then proceeds to select the specified object. Selection is indicated with visual feedback, such as highlighting, so the user can see what has been selected, as indicated by block 25. The current active command is then checked in block 26. If the command is END, then this procedure exits; otherwise, control returns to block 21.

In block 22, if the user selects an action, then control passes to block 27 where the system determines if the action selected is END. If it is, then this procedure terminates. Otherwise, the system checks to see what type of object was selected in block 28. In other words, is the object selected a primitive graphical object or group of primitive graphical objects, such as circles and rectangles, or is the object an entire graphic space?

If the object is a graphic space, then the system queries the user in block 29 about the graphic space attribute. This attribute indicates whether the graphic space should be a two dimensional space or a three dimensional space. The user's response is analyzed in block 30. If the user selected a three dimensional space, then the system will query the user as to whether or not he would like to move the vanishing point. If the user chooses to move the vanishing point, he would move the cursor to the indicated vanishing point using the locator device. The user would then press the select button and, keeping the select button pressed, the user could move the vanishing point to any point in the graphic space. By releasing the select button, the user will establish the vanishing point at the current position. This is all indicated by lock 31. Once the user has finished with the vanishing point, the previous value of the graphic space attribute is checked in block 32. If it was previously a two dimensional space, then all the objects in that space must be converted from two dimensional to three dimensional using the defined vanishing point and a default or user specified depth in block 33. The procedure in block 33 includes a call to the hidden line removal routine which is shown in the flow chart of FIG. 11. After the procedure in block 33 is finished, control then goes to block 26.

If the user selected a two dimensional graphic space, then the previous value of the graphic space attribute is checked in block 34. If the previous value was three dimensional, then all the objects in this graphic space must be converted from three dimensional to two dimensional. Only the lines in the XY plane will remain in the final picture, as indicated in block 35.

If the object type that the user selected was a primitive graphic object or a group of primitive graphic objects, then the current value of the graphic space attribute is checked in block 36. If the graphic space is a three dimensional space, then whatever action the user has selected will be done in three dimensions including creation, scaling, rotation, and the like. During the action, the defined vanishing point and a default depth will be used, as indicated in block 37. As in block 33, the procedure in block 37 includes a call to the hidden line removal routine shown in FIG. 11. When the procedure in block 37 is complete, control then goes back to block 26. If the graphic space is a two dimensional space, then the specified action is done in only the XY plane in block 38, and thereafter control returns to block 26.

The following code, which implements the invention, is written in program design language (PDL) from which source and object code can easily be derived. This code provides the three dimensional object set function.

```
REPEAT
    CALL READ_INPUT_DEVICE (SELECT_KEY_TYPE, OBJECT,
    ACTION)
        IF (SELECT_KEY_TYPE = OBJECT_SELECT_KEY) THEN
            IF PREVIOUS_SELECTION THEN
```

```
        CALL DESELECT_PREVIOUS_OBJECT
      ENDIF
      IF OBJECT_TYPE (OBJECT) = GRAPHIC_OBJECT THEN
        CALL SELECT_GRAPHIC_SPACE (OBJECT)
      ELSE
        CALL SELECT_GRAPHIC_SPACE (OBJECT)
      ENDIF
ELSE IF (SELECT_KEY_TYPE = ACTION_SELECT_KEY)
      THEN
      IF ACTION <> TERMINATE THEN
        IF OBJECT_TYPE (OBJECT) = GRAPHIC_SPACE THEN
          CALL QUERY_USER ('Set Object Set Attribute
              to 2D or 3D', GRAPHIC_SPACE_ATTRIBUTE)
          IF GRAPHIC_SPACE_ATTRIBUTE = 2D THEN
            IF PREVIOUS_GRAPHIC_SPACE_ATTRIBUTE = 3D
              THEN
              CALL TRANSLATE_TO_2D (OBJECT)
            ENDIF
          ELSE
            CALL SET_VANISHING_POINT (VANISH_X,
                VANISH_Y)
            IF PREVIOUS_GRAPHIC_SPACE_ATTRIBUTE = 2D
              THEN
              TRANSLATE_TO_3D (OBJECT, VANISH X,
                  VANISH_Y, DEFAULT_DEPTH)
            ENDIF
          ENDIF
        ELSE
          IF GRAPHIC_SPACE_ATTRIBUTE = 2D THEN
            CALL 2D_ACTION (OBJECT, ACTION)
          ELSE
            CALL 3D_ACTION (OBJECT, ACTION,
                VANISH_X, VANISH_Y, DEFAULT_DEPTH)
          ENDIF
        ENDIF
      ENDIF
ENDIF
UNTIL ACTION = END
```

In this code, it is assumed that the workstation is under mouse and keyboard device control. The mouse controls the movement of a visible pointing cursor which allows the user to determine the current cursor position on the screen. The mouse is also assumed to have two keys or buttons. One of these keys is used for selection of objects and menu options and is called the OBJECT_SELECT_KEY, and the other of these keys is used for requesting menu presentation and is called the ACTION_SELECT_KEY.

The application calls a routine to query the mouse device to determine if a mouse key has been pressed (CALL_READ_INPUT_DEVICE). READ_INPUT_DEVICE will return the type of selection the user has requested and the object or action that has been selected.

If the OBJECT_SELECT_KEY has been pressed, then a check is made to see if any objects were previously selected (PREVIOUS_SELECTION). If so, then a routine is called to deselect that object. OBJECT_TYPE is a function that is called to determine what type of object was selected. If the object type is a graphic object, then SELECT_GRAPHIC_OBJECT is called to highlight that object and update the data structure used to remember what is currently selected. If the object type was not a graphic object, then it must have been a graphic space; therefore, SELECT_OBJECT_SET is called to highlight the object set and update the data structure used to remember what is currently selected.

If the ACTION_SELECT_KEY has been pressed, then the system must determine if the action is the END action and, if so, control goes to the end of the REPEAT loop. Otherwise, the system checks to see the type of object being acted upon. OBJECT_TYPE is called to analyze the object and return the type. If the type is a GRAPHIC_SPACE, then QUERY_USER is called to display a message asking the user to initialize the OBJECT_SET_ATTRIBUTE. The user can respond with either "2D" or "3D". QUERY_USER returns with the user's response in OBJECT_SET_ATTRIBUTE. If the user selected "2D", then the system checks to see what the previous value of this attribute was. If it was previously set to "3D", then the procedure TRANSLATE_TO_2D is called to translate all objects in the selected object set to two dimensional objects. Only the surfaces along the XY plane will be visible in the final object set. If the user selected "3D", then the previous value of this attribute is checked. If it was equal to "2D" before, then the procedure TRANSLATE_TO_3D is called to translate all the objects in the selected object set to three dimensional objects. The vanishing point and the default depth are used to draw the objects.

If the ACTION_SELECT_KEY has been pressed and the object type is a graphic object, then the appropriate action must be done on that object. If the OBJECT_SET_ATTRIBUTE is "2D", then the action will be in two dimensional space only. Creation of a rectangle will produce a flat rectangle without any depth. Stretching an object will produce changes in the XY plane only. If the OBJECT_SET_ATTRIBUTE is "3D", then the action will produce a cube, and stretching a cube will produce changes in the XY, XZ and YZ planes. Both 2D_ACTION and 3D_ACTION will retain control as long as the action is in progress. The user can terminate the above repeat loop by selecting the END action.

Figure 11:
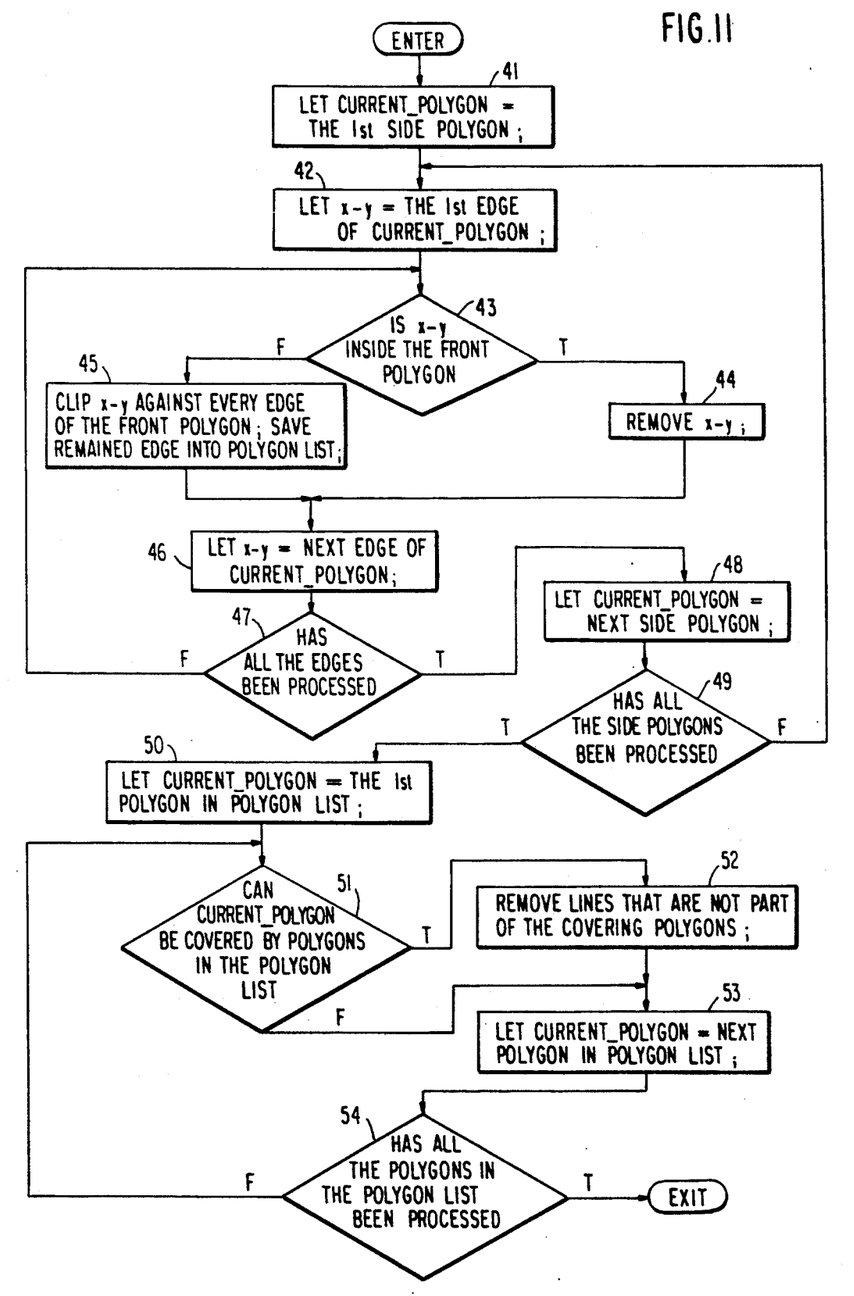

The procedure for removing hidden lines is shown in FIG. 11. This procedure is called in blocks 33 and 37 in FIG. 10. In FIG. 11, the procedure starts by arbitrarily picking the current polygon as the first side polygon in block 41. Then one of the lines which define the current polygon, here designated as line x-y, is chosen as the first edge of the polygon in block 42. This is the starting point, and in block 43, a decision is made as to whether the line x-y is inside the front polygon. If it is, the line x-y is removed in block 44; otherwise, the line x-y is clipped against every edge of the front polygon in block 45. The remaining portions of the clipped edges are saved in the polygon list. In either case, the next line which defines the polygon is set to be the current edge of the polygon in block 46. A test is then made in decision block 47 to determine if all the edges of the polygon have been processed. If not, the procedure returns to block 43, and the current edge is processed. This loop continues until all lines that define the polygon have been processed at which time the test in decision block 47 will be positive.

When all the lines that define the current polygon have been processed, the next side polygon is set to be the current polygon in block 48. A test is then made in decision block 49 to determine if all the side polygons have been processed. If not, the process returns to block 42 to begin the processing of the lines which define the current polygon. This loop continues until all of the side polygons have been processed at which time the test in decision block 49 will be positive.

When all the side polygons have been processed, the current polygon is set to be the first polygon in the polygon list in block 50. A test is then made in decision block 51 to determine if the current polygon can be covered by other polygons in the polygon list. If so, lines that are not part of the covering polygons are removed in block 52 and then the process goes to block 53; otherwise, the process goes directly to block 53. In block 53, the current polygon is set to the next polygon in the list, and in the decision block 54 a test is made to determine if all the polygons in the polygon list have been processed. If not, the process returns to decision block 51 to begin processing the current polygon. This process continues until all the polygons in the list have been processed at which time the process exits to the calling program.

The following PDL code implements the hidden line removal procedure illustrated in FIG. 11:

```
LET THE CURRENT POLYGON = THE FIRST SIDE POLYGON
REPEAT
    ASSIGN LINE X-Y = THE FIRST EDGE OF THE CURRENT
        POLYGON
    REPEAT
        IF X-Y IS COMPLETED INSIDE THE FRONT POLYGON
            THEN
            REMOVE LINE X-Y
        ELSE
            CLIP X-Y AGAINST EVERY EDGE OF THE FRONT
                POLYGON AND REMOVE THE CLIPPED PORTION
                FROM DISPLAY
            SAVE REMAINING EDGE INTO THE POLYGON LIST
        ENDIF
        ASSIGN X-Y = THE NEXT EDGE OF THE CURRENT
            POLYGON
    UNTIL ALL THE EDGES OF THE CURRENT POLYGON ARE
        COMPUTED
    LET THE CURRENT POLYGON = NEXT SIDE POLYGON
UNTIL ALL THE SIDE POLYGONS ARE COMPUTED
LET THE CURRENT POLYGON = THE FIRST POLYGON IN
    THE POLYGON LIST
REPEAT
    IF CURRENT POLYGON CAN BE COMPLETLY COVERED BY
        ANY POLYGON(S) IN THE POLYGON LIST THEN
        FIND THE LINE SEGMENTS WHICH ARE NOT PART OF
            THE COVERING POLYGON(S) AND REMOVE THOSE
            LINES FROM DISPLAY
    ENDIF
    LET CURRENT POLYGON = NEXT POLYGON IN THE
        POLYGON LIST
UNTIL ALL THE POLYGONS IN THE POLYGON LIST HAVE
    BEEN COMPUTED
```

In this code, the application first arbitrarily assigns as the current polygon the first side polygon in order to begin the process. Then one of the lines which define the current polygon is assigned as the first edge of the current polygon to be processed. This line x-y is tested to determine if it is inside the front polygon, and if it is, it is removed from the display. If the line x-y is not completed within the from polygon, it is clipped against every edge of the front polygon and the clipped portion of the line is removed from the display and the remaining portion of the line is saved in the polygon list. This process is repeated for all the lines which define the current polygon, and when processing is completed for the current polygon, the next side polygon becomes the current polygon and the process repeated until all of the side polygons have been processed.

Once all the side polygons have been processed and the polygon list is complete, the first polygon in the list is assigned as the current polygon for the next phase of the procedure. If the current polygon can be covered by any polygon or polygons in the polygon list, then the line segments which are not part of the covering polygon or polygons are found and removed from the display. When this has been done, the next polygon on the list becomes the current polygon and is processed in the same way. This process continues until all of the polygons in the list have been processed.

Those skilled in the art will appreciate that while the invention has been disclosed in terms of a specific preferred embodiment, in practice modifications can be made within the spirit and scope of the invention.

Having thus described a preferred embodiment of our invention, what we claim and wish to secure by Letters Patent is as follows:

1. A method of interactively generating a dynamic three dimensional perspective projection of graphics objects on a computer controlled display responsive to operate commands, comprising the steps of:

generating on the computer controlled display one or more graphics objects;

generating on the computer controlled display a cursor responsive to operator commands;

generating a link of relative position between the cursor responsive to operator commands and a selected vanishing point on said computer controlled display;

generating a first projection line having a default length from a first point on each of the graphics objects within said three dimensional graphic space directed toward said vanishing point;

generating additional projection lines having predetermined lengths, based upon said default length, from additional points on said graphics objects within said three dimensional graphic space directed toward said vanishing point;

moving said vanishing point within said three dimensional space in synchronous response to cursor related operator commands; and regenerating responsive to operator commands first and additional projection lines of the graphics objects within the three dimensional graphic space as a function of the location of said vanishing point to portray on the computer controlled display a dynamic image of the regeneration in synchronism with the movement of the cursor.

2. The method of generating a three dimensional perspective projection of graphics objects as recited in claim 1 further comprising the step of specifying a length of said projection lines different from said default length.

3. The method of generating a three dimensional perspective projection of graphics objects as recited in claim 1 wherein the step of defining the vanishing point is performed by the step of initially positioning the vanishing point at a default position.

4. The method of generating a three dimensional perspective projection of graphics objects as recited in claim 1, further comprising the steps of:

checking the graphics objects in synchronism with movement of the vanishing point for an opaque attribute; and removing those projection lines which are hidden by surfaces of said graphics objects defined by the projection of other lines from the graphics objects for those graphics objects having an opaque attribute.

* * * * *